US011729167B2

(12) United States Patent
Gregus et al.

(10) Patent No.: US 11,729,167 B2
(45) Date of Patent: Aug. 15, 2023

(54) AUTHORIZATION PROXY (71) Applicant: Target Brands, Inc., Minneapolis, MN (US)

(72) Inventors: Ryan Michael Gregus, Minneapolis, MN (US); Emma Matthies, Brooklyn Park, MN (US); Gokulnath Baskaran, Eden Prairie, MN (US); Andrew Thomas Guck, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 247 days.

(21) Appl. No.: 17/174,984

(22) Filed: Feb. 12, 2021

(65) Prior Publication Data

US 2022/0263825 A1 Aug. 18, 2022

(51) Int. Cl.
*H04L 9/40* (2022.01)
*H04W 28/08* (2023.01)
*H04W 28/086* (2023.01)

(52) U.S. Cl.
CPC ......... *H04L 63/0884* (2013.01); *H04W 28/08* (2013.01); *H04W 28/086* (2023.05)

(58) Field of Classification Search
CPC . H04L 63/0884; H04L 67/1001; H04L 67/63; H04L 63/10; H04L 67/563; H04W 28/08; H04W 28/0804; H04W 28/086
See application file for complete search history.

(56) References Cited

U.S. PATENT DOCUMENTS

| | | | |
|---|---|---|---|
| 8,036,222 B1 | 10/2011 | Huang et al. | |
| 8,638,795 B2 | 1/2014 | Jackowski et al. | |
| 8,695,075 B2 | 4/2014 | Anderson et al. | |
| 9,264,432 B1 | 2/2016 | Liu et al. | |
| 10,687,188 B2 | 6/2020 | Kim et al. | |
| 2008/0046719 A1* | 2/2008 | Kim | H04L 63/205 713/156 |
| 2008/0072226 A1* | 3/2008 | Armes | G06F 9/505 718/101 |
| 2009/0150320 A1* | 6/2009 | Geppert | G06F 21/31 726/4 |
| 2009/0210925 A1* | 8/2009 | Ogata | G06F 21/31 726/2 |

(Continued)

OTHER PUBLICATIONS

Dai et al., An effective grouping method for unstructured data based on swift, https://www.researchgate.net/profile/Dongjie_Zhu3/publication/326162669_An_Effective_Grouping_Method_for_Unstructured_Data_Based_on_Swift/links/5ed51b9c299bf1c67d323fe9/An-Effective-Grouping-Method-for-Unstructured-Data-Based-on-Swift.pdf, pp. 34-38, 2018.

(Continued)

*Primary Examiner* — Huan V Doan (74) *Attorney, Agent, or Firm* — Theodore M. Magee; Westman, Champlin & Koehler, P.A.

(57) ABSTRACT

A computer-implemented method includes a proxy receiving an authorization message from a load balancer and the proxy selecting an authorization cell from a plurality of authorization cells designated for the proxy in response to receiving the authorization message. The proxy sending a second authorization message to the selected authorization cell and the proxy receiving a response message from the selected cell, wherein the response message corresponds to the second authorization message. The proxy then sending a second response message to the load balancer in response to receiving the response message.

20 Claims, 5 Drawing Sheets

(56) References Cited

U.S. PATENT DOCUMENTS

| | | | | |
|---|---|---|---|---|
| 2012/0331479 A1* | 12/2012 | Takagi | ................... | G06F 9/505 |
| | | | | 718/105 |
| 2016/0078430 A1* | 3/2016 | Douglas | ............. | G06Q 30/0185 |
| | | | | 705/43 |
| 2017/0230351 A1* | 8/2017 | Hallenborg | ............. | H04L 63/08 |
| 2021/0282016 A1* | 9/2021 | Mohan | ................ | H04L 63/1458 |
| 2022/0141180 A1* | 5/2022 | Bhasin | .................... | H04L 69/40 |
| | | | | 726/1 |

OTHER PUBLICATIONS

Gontarczyk et al., Blueprint for cyber security zone modeling, IT in Industry, vol. 3, No. 2, pp. 38-46, 2015.

\* cited by examiner

AUTHORIZATION PROXY

BACKGROUND

Authorization servers receive access requests from computer applications, referred to as clients, that wish to access a protected resource. In response, the authorization cell uses an authorization flow to determine whether the owner of the resource has authorized such access. If the authorization server is able to determine that the owner of the resource has authorized the client to access the resource, the authorization server returns access token to the client that can be used by the client to gain access to the resource. The authorization server is sometimes packaged with other virtual machines executing other functions such as an Access Gateway to form an authorization cell.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes a proxy receiving an authorization message from a load balancer and the proxy selecting an authorization cell from a plurality of authorization cells designated for the proxy in response to receiving the authorization message. The proxy sending a second authorization message to the selected authorization cell and the proxy receiving a response message from the selected cell, wherein the response message corresponds to the second authorization message. The proxy then sending a second response message to the load balancer in response to receiving the response message.

In accordance with a further embodiment, a system includes a load balancer and a plurality of proxies. The load balancer receives authorization requests from a plurality of clients and for each authorization request, the load balancer selects one proxy of the plurality of proxies to send the authorization request to. A plurality of authorization cells are include in the system, wherein for each authorization request received at a proxy, the proxy selects one authorization cell of the plurality of authorization cells to send an authorization message to.

In accordance with a still further embodiment, a method includes providing a plurality of proxies that are configured to receive authorization requests from a load balancer and providing a plurality of authorization cells that are configured to receive authorization messages from each proxy of the plurality of proxies. Upon receiving an authorization request from the load balancer, a proxy of the plurality of proxies is configured to identify an authorization cell in the plurality of authorization cells, form the authorization message based on the received authorization request, and send the authorization message to the identified authorization cell.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In order to avoid authorization bottlenecks, prior art systems have instantiated multiple instances of authorization cells and placed a load balancer in front of the instances to balance authorization traffic between the instances. However, due to limitations of the load balancers the resulting system is less than ideal. In particular, when a minor change is made to the protocol of the authorization cells, the code of each client must be changed to match the new protocol. This can cause some clients to stop functioning if they do not receive the code update. In addition, each client in the current system is treated the same way by the load balancer. As a result, the traffic from a particular client cannot be segregated to a particular authorization cell. Because of this, particular clients cannot be given priority over other clients and when a code change is made to the authorization cell, all clients are exposed to the code change at the same time. This can result in system-wide failure if there is an error in the code change.

Existing load balancers are also unable to perform validation checks on the authorization request before submitting the request to the authorization cells. As a result, authorization cells waste time dealing with poorly formed requests. Further, existing load balancers lack sophisticated logging capabilities that allow for a full assessment of the performance of the various authorization cells.

In the embodiments described below, a layer of proxies is inserted between the load balancer and the authorization cells. Each proxy performs a preliminary validation of requests and rejects those requests that do not meet the basic requirements for a properly formed request. In addition, each proxy modifies requests to the authorization cell and responses from the authorization cell to accommodate changes to the protocols used by the authorization cells without requiring that changes be made to each client. Further, the proxies allow for traffic from particular clients to be directed to particular authorization cells. This allows for some clients to be given priority over other clients and allows for authorization cell testing that is limited to a subset of the clients. The proxies also have enhanced logging abilities relative to prior art load balancers.

Figure 1:
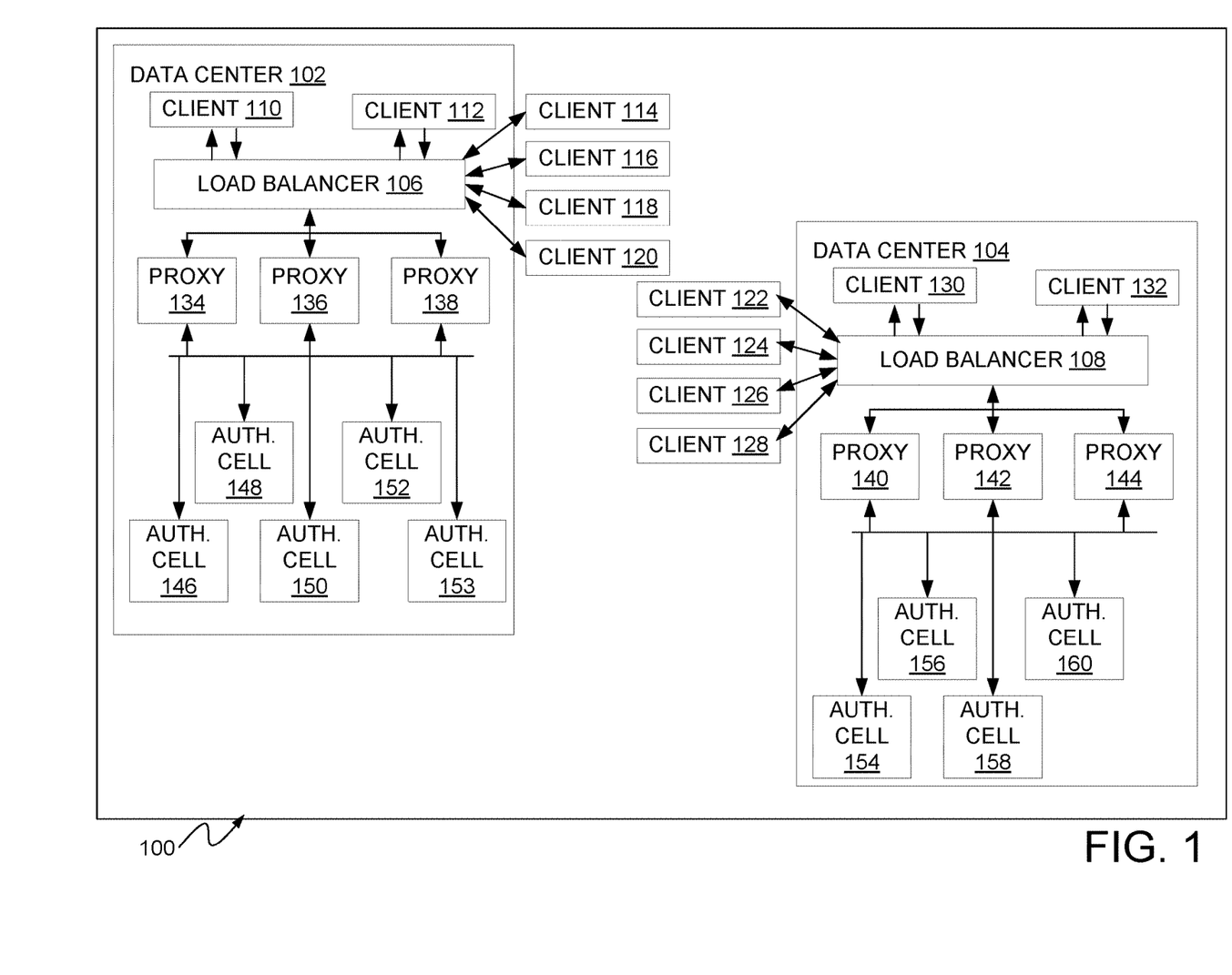
FIG. 1 is block diagram of a system for processing requests for access tokens for resources.

FIG. 1 provides a block diagram of a system 100 for authorizing access to protected resources. In system 100, two data centers 102 and 104 each contain respective load balancers 106 and 108. Each load balancer 106 and 108 receives access token requests from a plurality of clients 110, 112, 114, 116, 118, 120, 122, 124, 126, 128, 130, and 132. These clients include applications running within machines/virtual machines within data centers 102 and 104 and applications running external to data centers 102 and 104.

Load balancer 106 distributes the requests it receives from the various clients to a collection of proxies 134, 136 and 138 while load balancer 108 distributes the request it receives from the various clients to a collection of proxies 140, 142, and 144. Although proxies are shown for each data center, those skilled in the art will recognize that any number of proxies may be used.

Proxies 134, 136 and 138 are each able to send messages to any of a collection of authorization cells 146, 148, 150, 152 and 153 to request an access token on behalf of a client. Similarly, each of proxies 140, 142 and 144 is able to send a message to any of a collection of authorization cells 154, 156, 158 and 160 to request an access token on behalf of a client. In accordance with one embodiment, each proxy is limited to sending requests to authorization cells within the same data center as the proxy.

Each authorization cell includes at least one authorization server and other applications necessary to facilitate the generation of access tokens. The authorization server supports numerous different authorization flows such as Authorization Code, Client Credentials, Device Code and Refresh Token provided by the Oauth 2.0 authorization protocol. In accordance with one embodiment, the authorization server runs within a virtual machine within one of datacenters 102 and 104.

Figure 2:
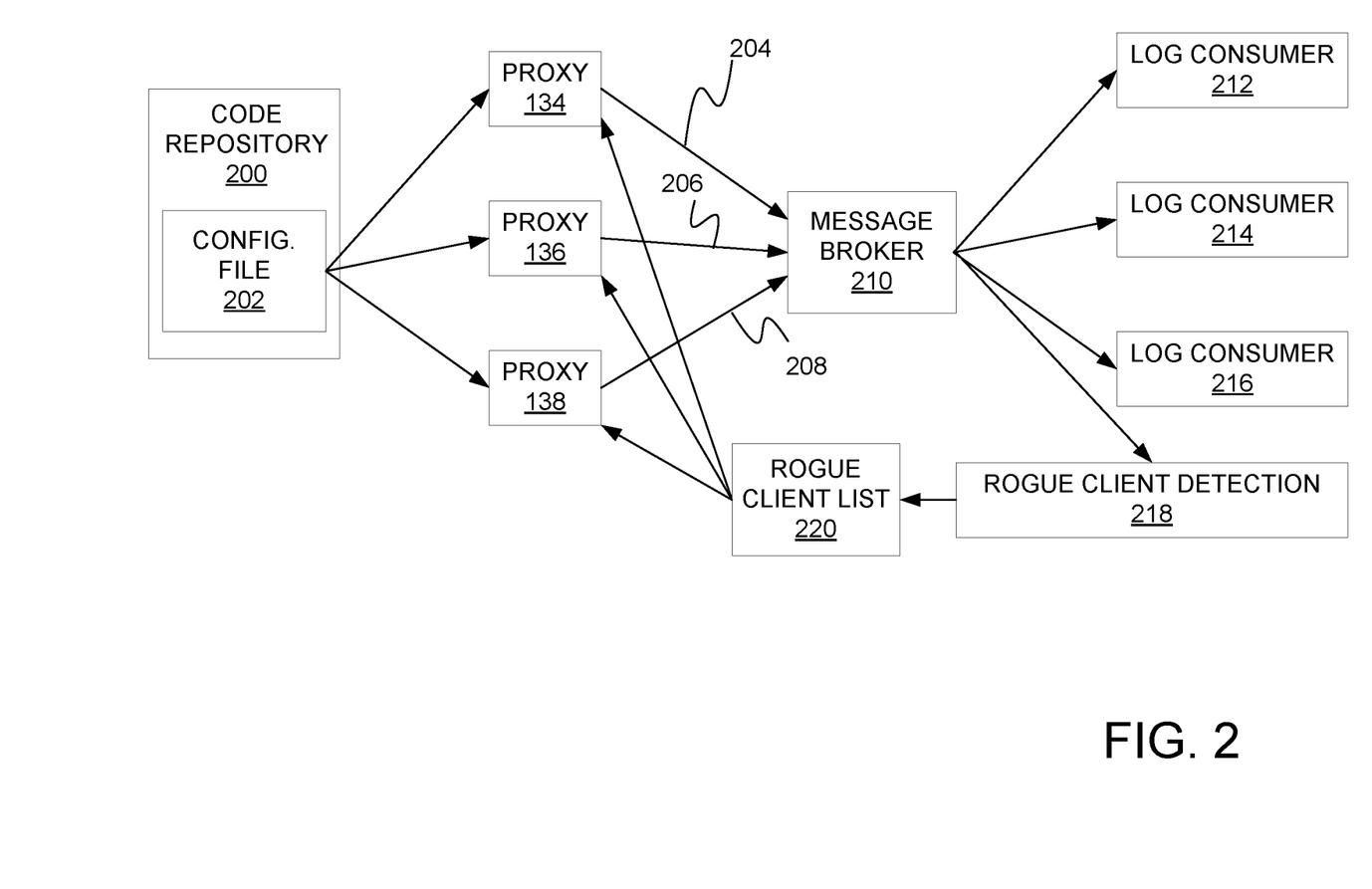
FIG. 2 is a block diagram showing proxies isolated from the load balancer and the authorization cells.

FIG. 2 shows a block diagram showing proxies 134, 136 and 138 isolated from load balancer 102 and authorization cells 146, 148, 150, 152 and 153 to show additional aspects of the proxies. Each of proxies 134, 136 and 138 periodically accesses a code repository 200 to determine if a configuration file 202 for the proxies has changed. If configuration file 202 has changed, each proxy downloads the new version of configuration file 202 and uses the content of the new version of configuration file 202 to configure how the proxy operates.

Each of proxies 134, 136 and 138 also generate log messages 204, 206 and 208 to log information about operations performed by the proxies as well as the results of requests for tokens received from the authorization cells. In particular, proxies 134, 136 and 138 generate a log message containing the time at which the proxy sent a request message to an authorization cell and a separate message containing the time at which the proxy received a message from the authorization cell in response to the request. Each log message is sent to a message broker 210, which in one embodiment is a Kafka message broker. Log consumers 212, 214 and 216 can serially request the log messages in the order they were provided to message broker 210 and use the log messages to generate metrics for the performance of one or more of the authorization cells and to identify errors generated relative to requests from particular clients.

Rogue client detection system 218 is an example of a log consumer that serially requests log messages from message broker 210 and uses the log messages to detect when a client is making too many authorization requests. Since rogue client detection system 218 makes this determination using log messages from all of the proxies, it is able to determine excessive authorization requests even when those requests are distributed across the proxies. When rogue client detection system 218 determines that a client is making too many authorization requests, it can rate limit that client by adding the client to a rogue client list 220 that each of proxies 134, 136 and 138 access when processing a client request. If a client is listed in rogue client list 220, the proxy rejects the authorization request without forwarding the request to an authorization cell. The rate limiting can involve placing the client on rogue client list 220 until the client stops sending authorization requests or alternating between having the client on rogue client list 220 for a period of time and not having the client on rogue client list 220 for a second period of time. This second manner of rate limiting the client allows some authorization requests to be processed but prevents the client from overwhelming the authorization cells with authorization requests.

Figure 3:
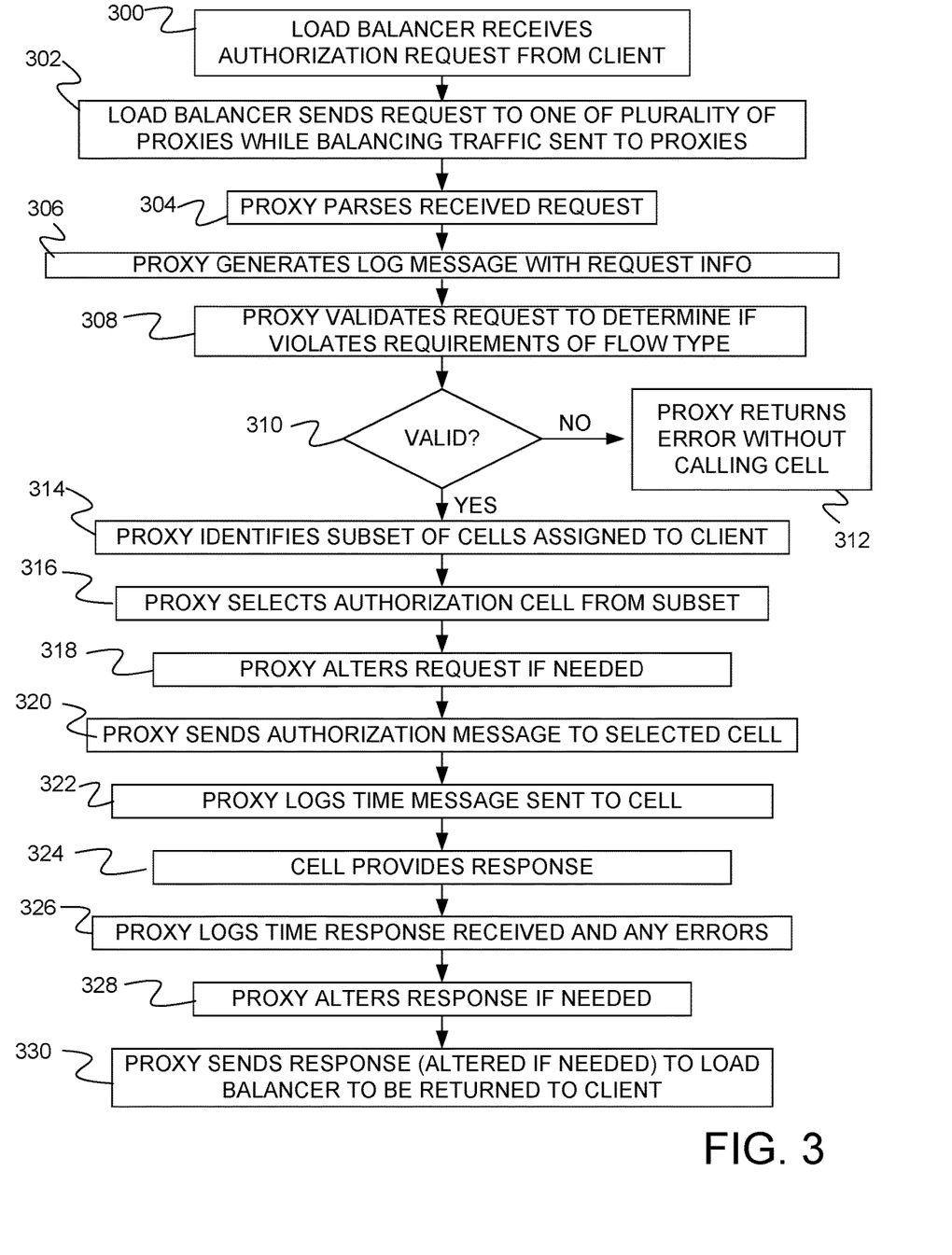
FIG. 3 is a flow diagram of method of processing access token requests in accordance with one embodiment.

FIG. 3 provides a flow diagram of a method of processing requests for access tokens in accordance with one embodiment. In step 300, a load balancer, such as load balancer 106 or load balancer 108, receives an authorization request from a client, such as client 110, 112, 114, 116, 118, 120, 122, 124, 126, 128, 130, or 132. At step 302, the load balancer sends the request to one of the plurality proxies available to the load balancer such as proxies 134, 136 and 138. In accordance with one embodiment, the load balancer attempts to balance traffic sent to the different proxies when selecting which proxy to send a request to. In accordance with some embodiments, the load balancer monitors the health of the proxies and only sends a request to a proxy if it is operating properly. The request sent to the proxies is referred to generically as an authorization message.

At step 304, the proxy that receives the request parses the request to retrieve sufficient information to identify which client sent the request, the authorization flow that is being used, and any credentials or secrets in the request. At step 306, the proxy generates a log message containing information about the request. In accordance with one embodiment, the proxy does not include any secrets in the log message. Each log message includes a time stamp that indicates when the request was received from the load balancer.

At step 308, the proxy validates the request to determine if it violates any requirements for a valid request of the identified authorization flow type. If the request validates one of the requirements at step 310, the proxy continues at step 312 where it generates and sends a log message to message broker 210 identifying the request and why the request was improper and returns an error message to the load balancer, which is then returned by the load balancer to the client that sent the request. Note that the error is generated without sending any traffic to any of the authorization cells for the request. This reduces the computational burden placed on the authorization cells and is especially helpful if a client repeatedly sends malformed authorization requests.

When a request is valid at step 310, the proxy determines which of the authorization cells the request message could possibly be sent to at step 314. In accordance with one embodiment this involves two determinations. First, the proxy examines the current configuration file to determine if a subset of the authorization cells has been set aside for the client that sent the request. If the configuration file indicates that certain authorization cells have been designated for the current client, only those cells are eligible to receive the request from the proxy. If no particular cells are designated for the client in the configuration file, then all of the authorization cells are eligible to receive the request from the proxy.

Figure 4:
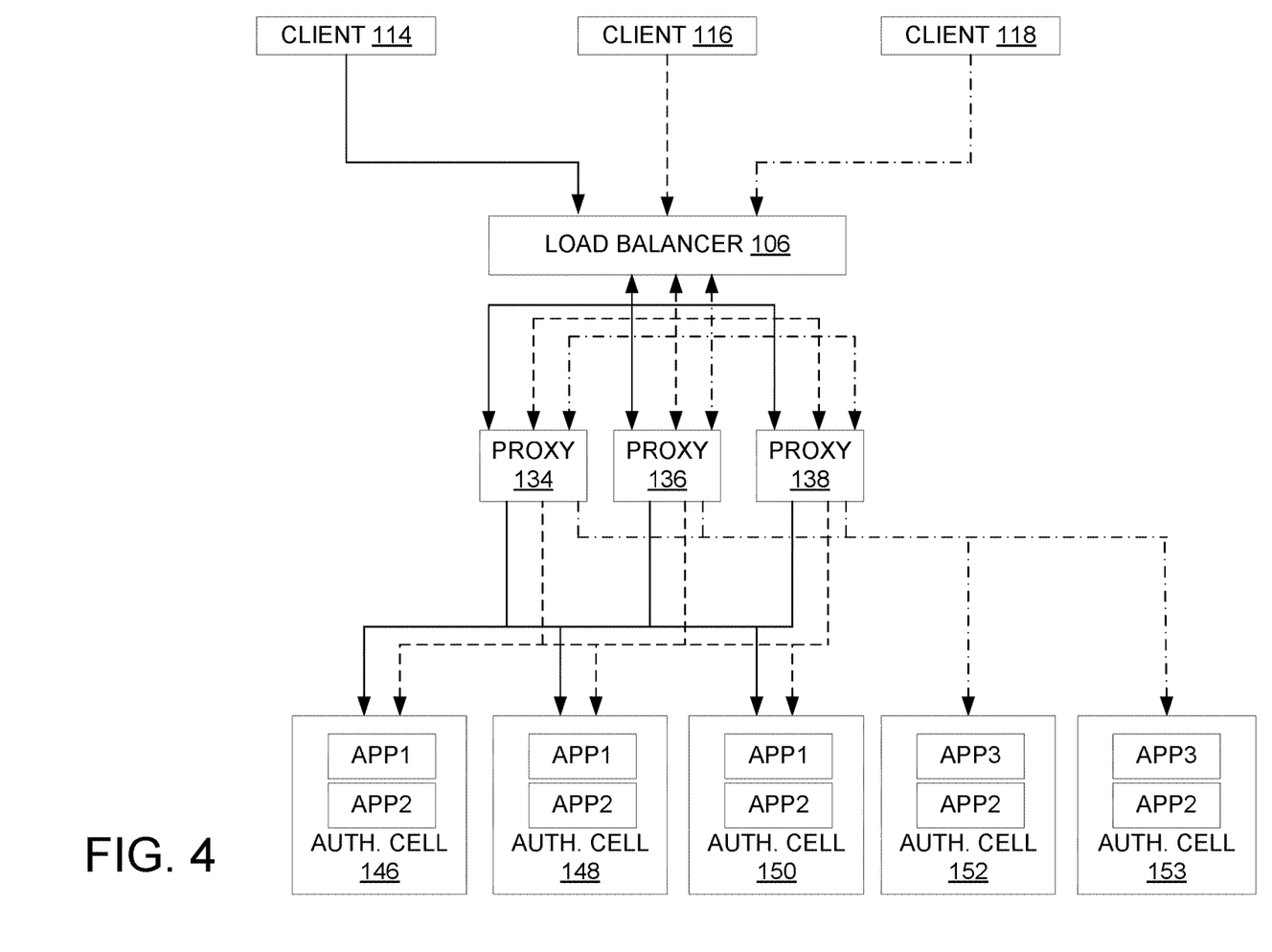
FIG. 4 is block diagram of a system for processing requests showing how request traffic is routed when authorization cells are designated for certain clients.

FIG. 4 shows a block diagram limited to clients 114, 116 and 118, load balancer 106, proxies 134, 136 and 138 and authorization cells 146, 148, 150, 152 and 153 to show how authorization cells are designated for clients in accordance with one embodiment. In FIG. 4, traffic from client 114 is shown by solid lines, traffic from client 116 is shown by dotted lines and traffic from client 118 is shown by a dash-dot-dash line. Although only a single instance of each client is shown in FIG. 4, traffic from any instances of clients 114, 116, and 118 are handled in the same manner.

In FIG. 4, configuration file 202 indicates that requests from instances of client 118 are to be directed to only authorization cells 152 and 153 while requests from all other clients are not to be directed to authorization cells 152 and 153. This is indicated in FIG. 4 by the solid lines for client 114 going through all of proxies 134, 136 and 138 but only extending to authorization cells 146, 148 and 150 and not authorization cells 152 and 153. Similarly, dashed lines for client 116 go through all of proxies 134, 136 and 138 but only extend to authorization cells 146, 148 and 150 and not authorization cells 152 and 153. The dash-dot-dash lines for the traffic of client 118, on the other hand, pass through all of proxies 134, 136 and 138 but only extend to authorization cells 152 and 153 and not authorization cells 146, 148 and 150.

Because the proxies are able to control which authorization cells receive requests from particular clients, the various embodiments have significant advantages over the prior art. First, authorization cells can be set aside for a particular client or set of clients. This gives such clients priority to those authorization cells allowing those clients to receive their access tokens faster under certain circumstances. In addition, assigning particular authorization cells to particular clients allows for testing of new authorization cell code without exposing all clients to the new code. This limits the impact of errors in the new authorization cell code to one client instead of all clients of the system. Such a change in the authorization cells is shown in FIG. 4 where authorization cells 146, 148 and 150 have application APP1 while authorization cells 152 and 153 have new application APP3 instead of APP1. Since only instances of client 118 use authorization cells 152 and 153, any errors in new application APP3 will only affect instances of client 118 while instances of clients 114 and 116 will continue to work using the existing application APP1.

Once the eligible authorization cells have been identified at step 314, the proxy determines the current health and status of each eligible authorization cell. The current health of an authorization cell is determined by the authorization cell itself, which periodically applies synthetic authorization requests to itself to determine if it is able to process such requests. In accordance with one embodiment, each authorization cell exposes an endpoint that will provide the current health of the authorization cell when called. The status of an authorization cell is whether the authorization cell is currently enabled and therefor accepting requests or has been disabled. In accordance with one embodiment, disabled authorization cells will continue to check their own health and will continue to provide their current health through their exposed endpoint. This allows for a quick determination of which disabled authorization cells should be reenabled when scaling the system to accommodate sudden increases in authorization requests.

At step 316, the proxy selects one of the authorization cells that is eligible for the client, that is enabled and that is healthy. At step 318, the proxy uses the identity of the client and the identity of the authorization cell to determine if the request must be modified before it is provided to the authorization cell. In accordance with some embodiments, the proxies are able to modify the requests provided by clients when the format of the request violates a requirement of the identified authorization cell. For example, if all of the clients and the authorization cell had been programmed to use a first format for the requests and then the authorization cell was reprogrammed to use a slightly different format but the clients had not been reprogrammed, the proxy modifies requests from such clients so that the modified requests match the requirements of the reprogrammed authorization cells. By making such changes to requests at the proxies, each individual client does not have to be reprogrammed whenever a change is made to the format of the requests expected by the authorization cells. This reduces the number of errors that occur at the authorization cells because it is often difficult to make sure that every client is reprogrammed when the authorization cells are modified. In accordance with one embodiment, the need to reformat the request and the manner in which the request is to be reformatted is listed in the current configuration file 202 and is indexed by the combination of the client and the authorization cell. When the request needs to be modified, the proxy modifies the request to form a new request message (alternatively referred to as a second authorization message). At step 320, the second authorization message (the new request message (if any) or the original request message from the client) is sent by the proxy to the identified authorization cell. The proxy then generates a log message at step 322 indicating the time at which the second authorization message was sent to the authorization cell.

At step 324, the authorization cell provides a response message to the proxy that includes the access token or an error message. At step 326, the proxy generates a log message indicating the time at which the return message was received and the type of error received, if any. At step 328, the proxy uses the identity of the client and the identity of the authorization cell to determine if the format of the response message needs to be changed before being returned to the client. Such changes are necessary when the authorization cell has been reprogrammed to provide a different format for the response message but the client has yet to be reprogrammed to accept the new format for the response message. In accordance with one embodiment, the need to reformat the response message and the manner in which the response message is to be reformatted is listed in the current configuration file 202 and is indexed by the combination of the client and the authorization cell.

At step 330, the proxy returns a second response message (the modified response message, if generated, or the original response message from the authorization cell) to the load balancer, which then forwards the second response message to the client.

Figure 5:
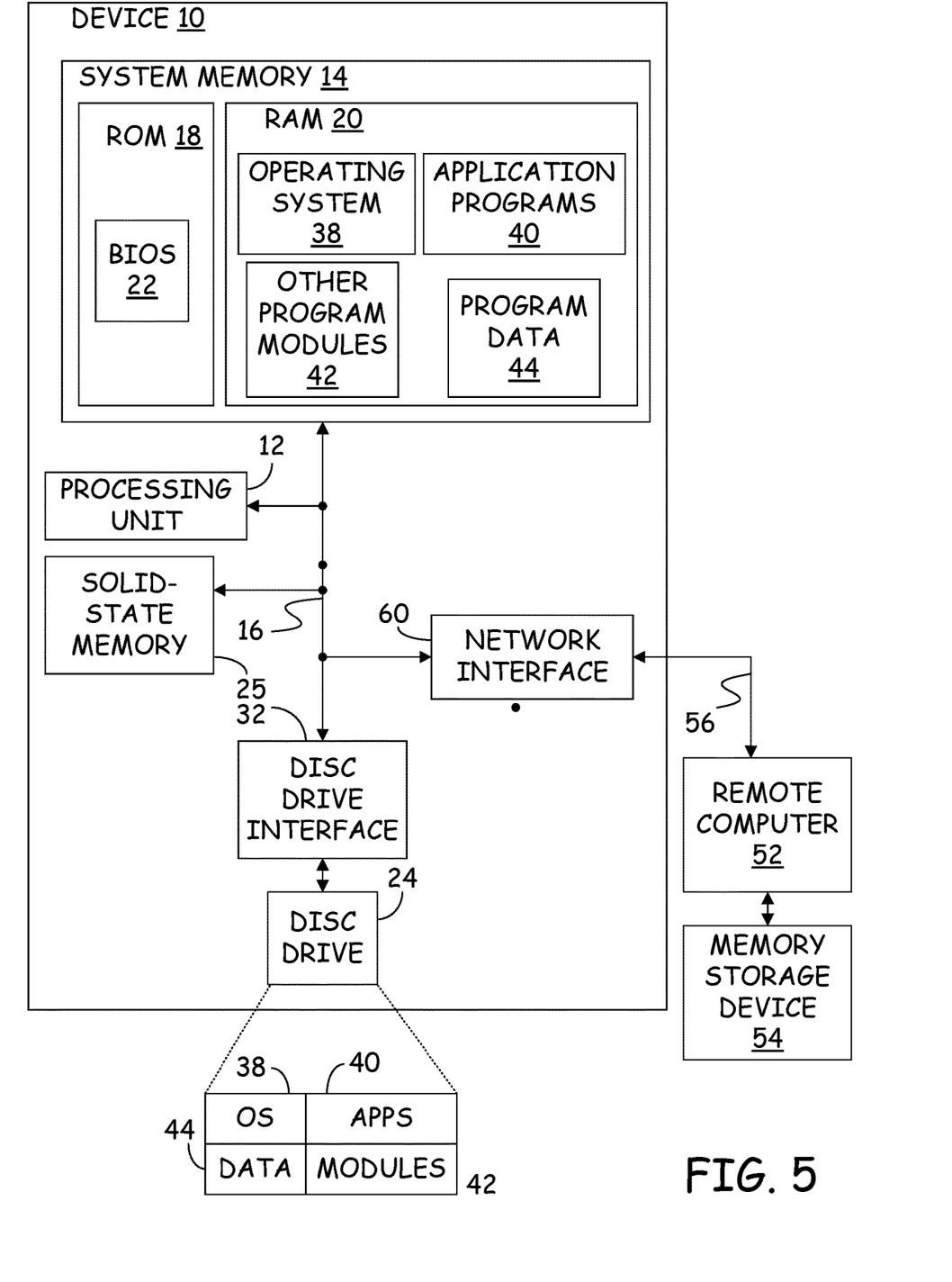
FIG. 5 is a block diagram of a computing device on which clients, load balancers, proxies and authorization cells may be executed.

FIG. 5 provides an example of a computing device 10 that any of the clients, load balancers, proxies, or authorization cells can be executed on. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24. Hard disc drive 24 is connected to the system bus 16 by a hard disc drive interface 32. The drive and its associated computer-readable media provide nonvolatile storage media for the computing device 10 on which computer-executable instructions and computer-readable data structures may be stored. Other types of media that are readable by a computer may also be used in the exemplary operation environment as non-volatile memory such as solid-state memory.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 5.

The computing device 10 is connected to remote computer 52 through a network interface 60.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 5 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
a proxy receiving an authorization message from a load balancer;
the proxy selecting an authorization cell from a plurality of authorization cells designated for the proxy in response to receiving the authorization message, wherein at least two of the authorization cells in the plurality of authorization cells execute a same authorization application;
the proxy sending a second authorization message to the selected authorization cell;
the proxy receiving a response message from the selected authorization cell, wherein the response message corresponds to the second authorization message; and
the proxy sending a second response message to the load balancer in response to receiving the response message.

2. The computer-implemented method of claim 1 wherein the proxy modifies the received authorization message to form the second authorization message.

3. The computer-implemented method of claim 2 wherein the received authorization message fails to satisfy at least one requirement of the selected authorization cell and wherein the proxy modifies the received authorization message so that the second authorization message satisfies all requirements of the selected authorization cell.

4. The computer-implemented method of claim 1 further comprising the proxy examining the authorization message to identify a client that sent the authorization message and selecting the authorization cell based on the identified client.

5. The computer-implemented method of claim 4 wherein the proxy selects the authorization cell based on the identified client by selecting one authorization cell from a plurality of authorization cells assigned to the identified client wherein the plurality of authorization cells assigned to the identified client is a subset of the plurality of authorization cells designated for the proxy.

6. The computer-implemented method of claim 4 wherein the proxy is prevented from sending authorization messages sent by other clients to the plurality of authorization cells assigned to the identified client.

7. The computer-implemented method of claim 1 wherein the proxy verifies that the authorization message satisfies at least one requirement before sending the authorization message as the second authorization message.

8. The computer-implemented method of claim 1 further comprising the proxy logging when the second authorization message is sent to the selected authorization cell and when the response message is received from the authorization cell.

9. The computer-implemented method of claim 1 further comprising the proxy monitoring the health of each of the plurality of authorization cells.

10. A system comprising:
a load balancer having a hardware processor receiving authorization requests from a plurality of clients;
a plurality of proxies, wherein for each authorization request, the load balancer selects one proxy of the plurality of proxies to send the authorization request to; and
a plurality of authorization cells, wherein for each authorization request received at a proxy, the proxy selects one authorization cell of the plurality of authorization cells to send an authorization message to, wherein each of the plurality of proxies is able to communicate with each of the plurality of authorization cells.

11. The system of claim 10 wherein at least one authorization request received at a proxy does not satisfy a requirement of an authorization cell in the plurality of authorization cells and the proxy creates the authorization message so that the authorization message satisfies all requirements of the authorization cell.

12. The system of claim 10 wherein the proxy selects the one authorization cell of the plurality of cells by identifying what client sent the authorization request to the load balancer and selecting the one authorization cell based on the identified client.

13. The system of claim 12 wherein the proxy selects the one authorization cell from a subset of the plurality of authorization cells, wherein authorization messages from the client are limited to being sent to authorization cells in the subset.

14. The system of claim 13 wherein the proxy is prevented from sending authorization messages from other clients to authorization cells in the subset.

15. The system of claim 10 wherein the proxy verifies that the authorization request satisfies at least one requirement before sending the authorization message to the one authorization cell.

16. The system of claim 10 further comprising the proxy logging when the second authorization message is sent to the selected authorization cell and when the response message is received from the authorization cell.

17. The system of claim 10 wherein the proxy determines whether the client is rate limited and only sends an authorization message to an authorization cell when the client is not rate limited.

18. A method comprising:
providing a load balancer receiving authorization requests from a plurality of clients;
providing a plurality of proxies that are configured to receive authorization requests from the load balancer, wherein for each authorization request, the load balancer selects one proxy of the plurality of proxies to send the authorization request to; and
providing a plurality of authorization cells that are configured to receive authorization messages from each proxy of the plurality of proxies;
wherein upon receiving an authorization request from the load balancer, a proxy of the plurality of proxies is configured to identify an authorization cell in the plurality of authorization cells, form the authorization message based on the received authorization request, and send the authorization message to the identified authorization cell, wherein each of the plurality of proxies is able to communicate with each of the plurality of authorization cells.

19. The method of claim 18 wherein the proxy of the plurality of proxies is configured to modify the authorization request to form the authorization message.

20. The method of claim 18 wherein the proxy of the plurality of proxies identifies the authorization cell based in part on a client that sent the authorization request.

\* \* \* \* \*